United States Patent
Ito et al.

(10) Patent No.: US 7,407,223 B2
(45) Date of Patent: Aug. 5, 2008

(54) AUTOMOTIVE FLOOR PANEL ASSEMBLY

(75) Inventors: Hideaki Ito, Wako (JP); Hirokuni Kumekawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 11/370,431

(22) Filed: Mar. 8, 2006

(65) Prior Publication Data

US 2006/0214473 A1   Sep. 28, 2006

(30) Foreign Application Priority Data

Mar. 10, 2005   (JP) ............................... 2005-067671

(51) Int. Cl.
*B60J 7/00* (2006.01)
(52) U.S. Cl. .................... 296/193.07; 296/30
(58) Field of Classification Search ............ 296/193.07, 296/30, 204, 187.08
See application file for complete search history.

(56) References Cited

U.S. PATENT DOCUMENTS 6,679,546 B2 *   1/2004   Mishima et al. ........ 296/203.01

FOREIGN PATENT DOCUMENTS

JP   2003-252251   9/2003

* cited by examiner

*Primary Examiner*—Joseph D Pape
(74) *Attorney, Agent, or Firm*—Rankin, Hill & Clark LLP

(57) ABSTRACT

In an automotive floor panel assembly comprising a floor panel (1) stamp-formed of sheet metal and including a recess (21, 22) defining an upper concave surface and a lower convex surface, a compound longitudinal floor frame is formed by a lower reinforcement (24) extending longitudinally across a part of the lower convex surface of the floor panel and an upper reinforcement (25) extending longitudinally across a part of the upper concave surface of the floor panel. The lower and upper reinforcements include a first vertical wall having an upper edge closely following a contour of the lower convex surface a second vertical wall having a lower edge closely following a contour of the supper concave surface, respectively. The compound longitudinal floor frame is thus provided with a substantially constant cross section and extends substantially linearly over the entire length of the floor panel and hereby. Therefore, the height of a lowest part of the floor panel from the ground surface is prevented from being reduced, and the mechanical strength of the floor panel would not be compromised even when the floor pane is provided with a downward projection.

15 Claims, 6 Drawing Sheets

AUTOMOTIVE FLOOR PANEL ASSEMBLY

TECHNICAL FIELD

The present invention relates to an automotive floor panel assembly which ensures an improved mechanical strength of the automotive body and an improved ride quality.

BACKGROUND OF THE INVENTION

In a moncoque automotive body structure, various body panel members are stamp formed from thin steel plate, and are joined by spot welding or the like so as to form the final body structure. The floor panel assembly that forms the floor of the body is typically provided with reinforcements such as longitudinal floor frames and floor cross members on the upper and lower surfaces thererof so as to ensure the mechanical strength and rigidity that are required to support the weight of the seats and vehicle occupants.

When providing a longitudinal floor frame to the lower surface of the floor panel, it is desirable that the longitudinal floor frame has a substantially constant cross section over the entire length thereof to minimize vibrations and noises, prevent stress concentration and ensure a favorable distribution of crash impact energy.

Electropaining is commonly used for painting automotive bodies. This process involves the dipping of the body into water containing particles of paint suspended therein, and the body is required to have an arrangement for facilitating the draining of the water trapped in the body when the body is lifted out of the water. For this purpose, an automotive floor panel is typically provided with a recessed portion in a longitudinally middle portion thereof and draining holes are formed in low parts of such a recessed portion. A longitudinal floor frame for such a floor panel is typically curved so as to extend along the curved contour of the lower surface of the floor panel, and is provided with a substantially uniform height over the entire length thereof. Such an example can be found in Japanese patent laid open publication No. 2003-252251.

FIG. 6a shows a conventional arrangement in which a longitudinal floor frame 31 is attached to the lower surface of a floor panel which is provided with a recess 22 defining an upper concave surface and a lower convex surface. The longitudinal floor frame 31 is provided with a curved section 31a which is curved so as to conform to the lower convex surface. The curved section 31a reduces the height Z of the lowest part of the body from the ground level, and this impairs the capability of the automobile to travel in a rugged terrain or creates the need to raise the height of other parts of the automobile body.

This problem can be overcome by locally reducing the height of the longitudinal floor frame 31 as indicated by numeral 31b in FIG. 6b so as to accommodate the lower convex surface of the floor panel while keeping the lower surface of the longitudinal floor frame 31 flat or horizontal over the entire length thereof. However, this part 31b which is reduced in height creates a weak portion 31c having a reduced cross section. Also, stress tends to concentrate in such a portion lacking in uniformity.

BRIEF SUMMARY OF THE INVENTION

In view of such problems of the prior art, a primary object of the present invention is to provide an automotive floor panel assembly which ensures an improved mechanical strength of the automotive body and an improved ride quality.

A second object of the present invention is to provide an automotive floor panel assembly which can reinforce a floor panel having a downward projection without reducing a height of a lowest part of the floor panel from the ground surface.

A third object of the present invention is to provide an automotive floor panel assembly which can reinforce a floor panel having a downward projection without compromising the mechanical strength of the floor panel.

At least some of such and other objects of the present invention can be accomplished by providing an automotive floor panel assembly, comprising: a floor panel stamp-formed of sheet metal and including a recess defining an upper concave surface and a lower convex surface; a lower reinforcement extending longitudinally across a part of the lower convex surface of the floor panel, the lower reinforcement including a first vertical wall having an upper edge closely following a contour of the lower convex surface; and an upper reinforcement extending longitudinally across a part of the upper concave surface of the floor panel, the upper reinforcement including a second vertical wall having a lower edge closely following a contour of the supper concave surface.

The lower reinforcement is locally reduced in height to accommodate the lower convex surface of the floor panel, and this part having is reduced height is matched by a corresponding part of the upper reinforcement which extends into the recess of the floor panel so that the lower reinforcement and the upper reinforcement jointly form a compound longitudinal floor frame which is provided with a substantially constant cross section and extends substantially linearly over the entire length of the floor panel and hereby. Therefore, the height of a lowest part of the floor panel from the ground surface is prevented from being reduced, and the mechanical strength of the floor panel would not be compromised even when the floor pane is provided with a downward projection.

Typically, the recess is defined by a slanted surface slanting downward from a front part of the recess to a rear part of the recess and a vertical wall which rises substantially upright from the rear part of the recess and connected to a substantially horizontal raised rear portion of the floor panel, and the floor panel is provided with a longitudinal floor tunnel extending longitudinally across a laterally middle part of the floor panel, and the recess is provided on each lateral side of the floor tunnel.

According to a preferred embodiment of the present invention, the lower reinforcement comprises a substantially horizontal bottom wall, and the first vertical wall extends vertically at least from a lateral edge of the bottom wall, and the first vertical wall is attached to the lower surface of the floor panel via a flange extending laterally from the upper edge of the vertical wall.

So as to best accommodate the downward projection of the floor panel defined by each recess, preferably, the flange is provided in a front part and a rear part of the lower reinforcement, and there is a break between the flanges in the front and rear parts of the lower reinforcement.

According to an aspect of the present invention, the upper reinforcement may comprise a rear portion extending substantially horizontally and attached to the substantially horizontal raised rear portion of the floor panel, and a front portion extending forwardly from (preferably a central part of) a front edge of the rear portion and having a front end attached to an upper surface (which may be either that of the recess or a part ahead thereof) of the floor panel.

The upper reinforcement may further comprise a third vertical wall extending downwardly from at least a part of a front edge of the rear portion, the third vertical wall being attached to a bottom surface of the recess via a flange, and the second vertical wall may be integrally and continuously connected to the third vertical wall.

Preferably, the rear portion includes an overhang portion which overhangs above the recess of the floor panel, and this overhang portion is provided with a feature such as a hole or projection for supporting a leg of a seat.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
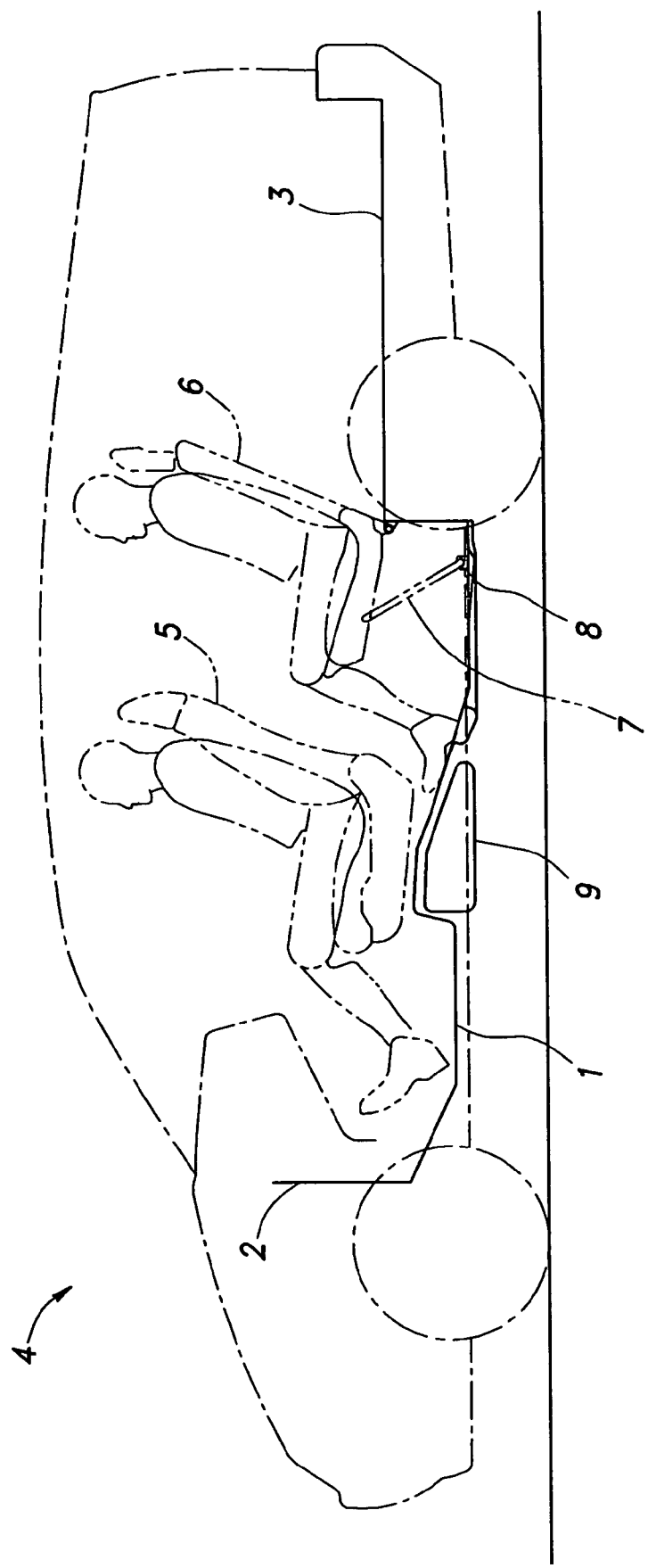
FIG. 1 is a schematic side view of an automobile to which the present invention is applied.

FIG. 1 shows a floor panel 1 of a hatchback automobile embodying the present invention. The floor panel 1 consists of a stamp-formed steel sheet of plate having a small thickness, and defines a floor surface of a automobile body in cooperation with a front dashboard panel 2 connected to the front edge thereof and a rear floor panel 3 connected to the rear edge thereof. A pair of front seats 5 are mounted on a longitudinally central part of the floor panel 1, and a pair of collapsible rear seats 6 are mounted on a rear end part of the floor panel 1. The rear seats 6 may also consist of fixed seats. Each rear seat 6 is attached to the front end of the rear floor panel 3 via a hinge. A catch device 8 is provided on the floor panel 1, and is adapted to selectively engage the free end of a leg stand 7 of the corresponding rear seat 6 so that the rear seat 1 may be held in the deployed position when desired. The lower surface of the floor panel 1 is recessed at a longitudinally central part or in a part immediately under the front seats 5 to receive a fuel tank 9 therein.

Figure 2:
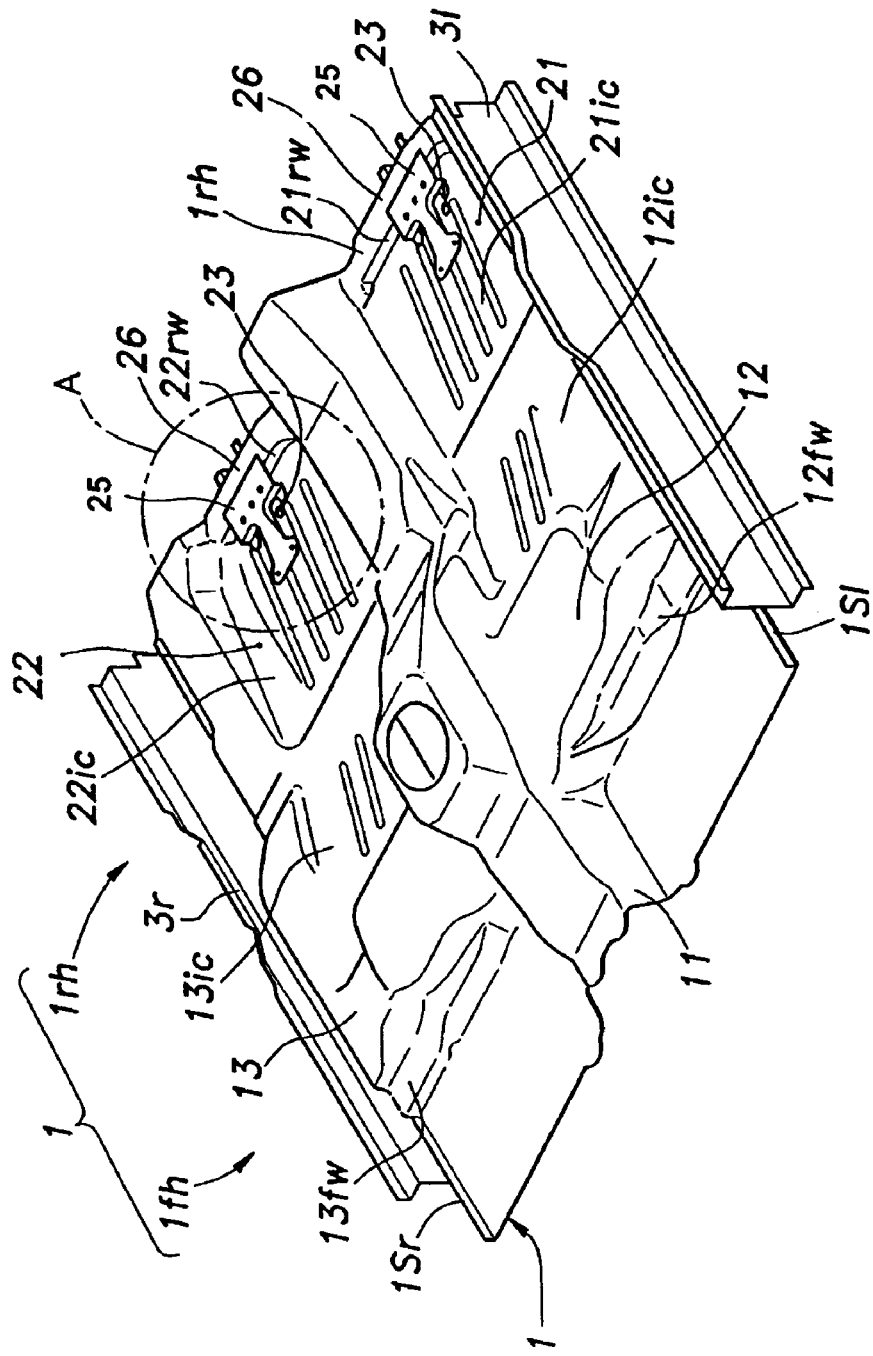
FIG. 2 is a perspective view of the upper surface of a floor panel assembly embodying the present invention.

Referring to FIG. 2, the floor panel 1 is rectangular in shape as seen in plan view, and is given with an added rigidity by beads and recesses/projections formed therein. A pair of side sill inners 3l and 3r each having a rectangular open cross section are spot welded to either lateral side edge of the floor panel 1, and side sill outers (not shown in the drawings) or outer panels are welded to the outer sides of the corresponding side sill inners 3l and 3r, respectively.

A laterally central part of the floor panel 1 is formed with a longitudinal floor tunnel 11 extending in the longitudinal direction and having a trapezoidal cross section so as to increase the rigidity of the floor panel assembly against bending in the longitudinal direction (or bending about a lateral line). A pair of lateral floor tunnels 12 and 13 extend laterally from a front part of the longitudinal floor tunnel 11 to the corresponding side sill inners 3l and 3r, respectively, so as to increase the rigidity of the floor panel assembly against bending in the lateral direction (or bending about a longitudinal line).

Each lateral floor tunnel 12 or 13 includes a front wall 12$fw$ or 13$fw$ extending upward from a front floor portion 1$fh$ of the floor panel 1, a relatively horizontal main section extending rearwardly from the upper end of the front wall 12$fw$ or 13$fw$ and an oblique wall 12$ic$ or 13$ic$ extending obliquely from the rear end of the horizontal main section to a rear floor portion 1$rh$ that supports the rear seats 6.

Figure 3:
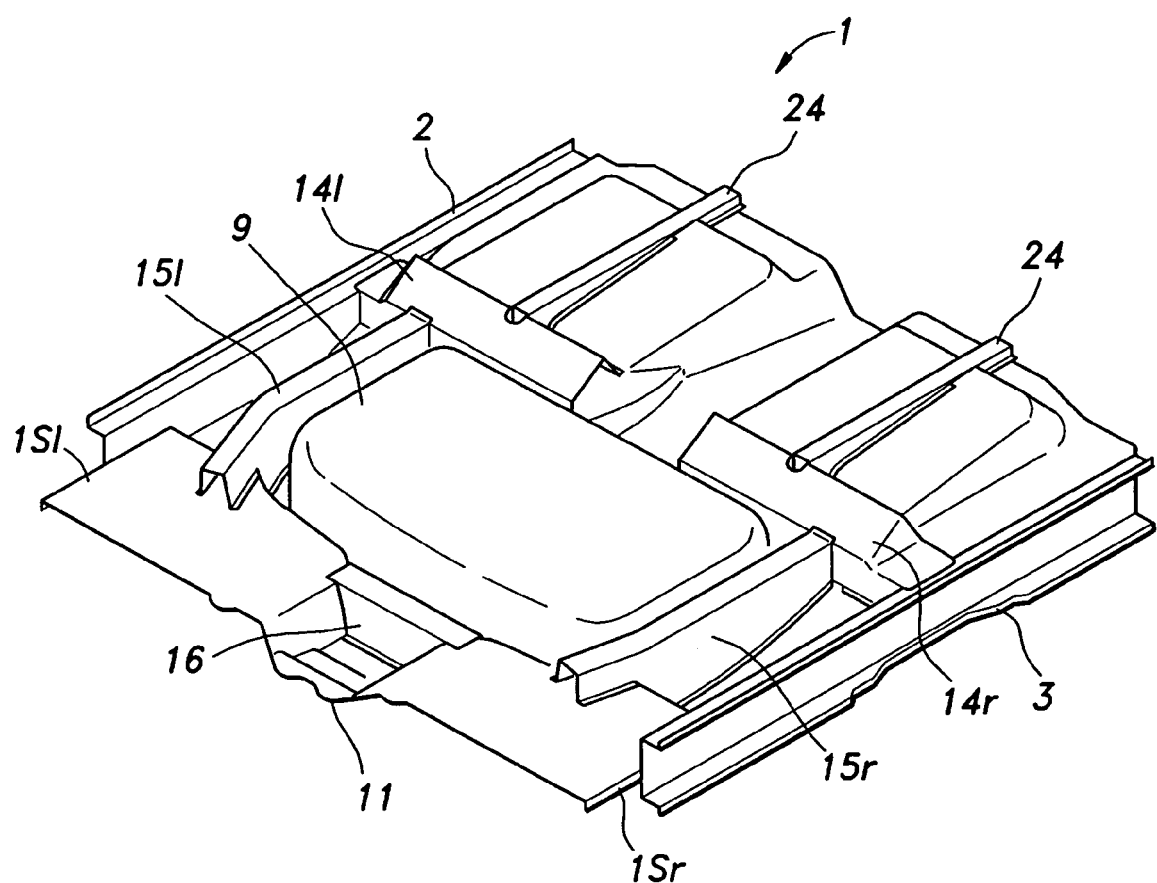
FIG. 3 is a perspective view of the bottom surface of the floor panel assembly shown in FIG. 2.

Referring to FIG. 3, on the bottom side of the floor panel 1, a pair of floor cross members 14l and 14r each having a rectangular open cross section are welded to the rear end of the corresponding oblique walls 12$ic$ and 13$ic$ at flanges extending along front and rear edges of the open side of the floor cross members 14l and 14r, respectively. Thereby, a pair of laterally extending structures having a closed cross section are formed along the lower surface of the rear edges of the oblique walls 12$ic$ and 13$ic$, respectively. The lateral ends (or lengthwise ends) of each laterally extending structures may be either closed or left open as desired. The recess formed on the lower surface of the floor panel 1 by the lateral floor tunnels 12 and 13 is used for accommodating the fuel tank 9 therein. A side floor frame 15l or 15r extends longitudinally on each side of the fuel tank 9 between the corresponding front wall 12$fw$ or 13$fw$ of the lateral floor tunnel 12 or 13 and the front wall of the corresponding floor cross member 14l or 14r. A relatively short front floor cross member 16 extends laterally between the two inner walls of the longitudinal floor tunnel 11 along the front end of the fuel tank 9.

Figure 4:
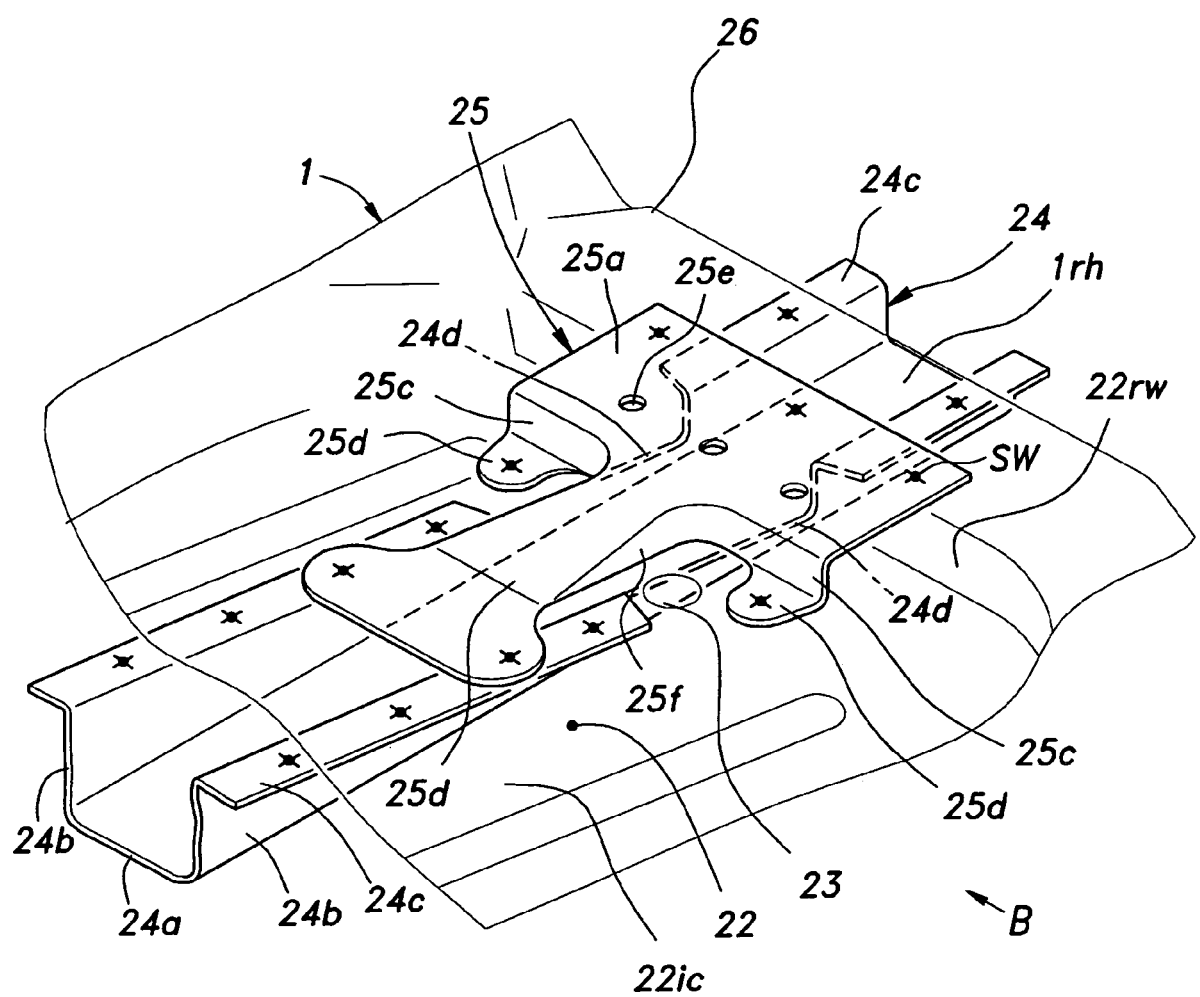
FIG. 4 is an enlarged view of a part indicated by circle A in FIG. 2.

As shown in FIGS. 2 and 4, the rear floor portion 1$rh$ of the floor panel 1 is provided with a pair of recesses 21 and 22 on either side of the longitudinal floor tunnel 11. Each recess 21 or 22 includes a slanted bottom surface 21$ic$ or 22$ic$ having a downward slope toward a rear part thereof and a vertical rear wall 21$rw$ or 22$rw$ extending upright from the rear edge of the corresponding slanted bottom surface 21$ic$ or 22$ic$. The upper edge of each vertical rear wall 21$rw$ or 22$rw$ is connected to a relatively horizontal raised section 26 which defines the very rear edge of the floor panel 1. A drain hole 23 is formed in a rear end (or a lowest portion) of each slanted bottom surface 21$ic$ or 22$ic$ to facilitate the draining of paint liquid upon completion of electropainting process. When the floor panel 1 is lifted out of an electropainting vessel following a painting process, the paint liquid is collected in the recesses 21 and 22 and drained from the drain holes 23 back into the electropainting vessel. These recesses 21 and 22 may also be formed as a means for accommodating various pieces of equipment or other arrangements for the passenger compartment.

Figure 5:
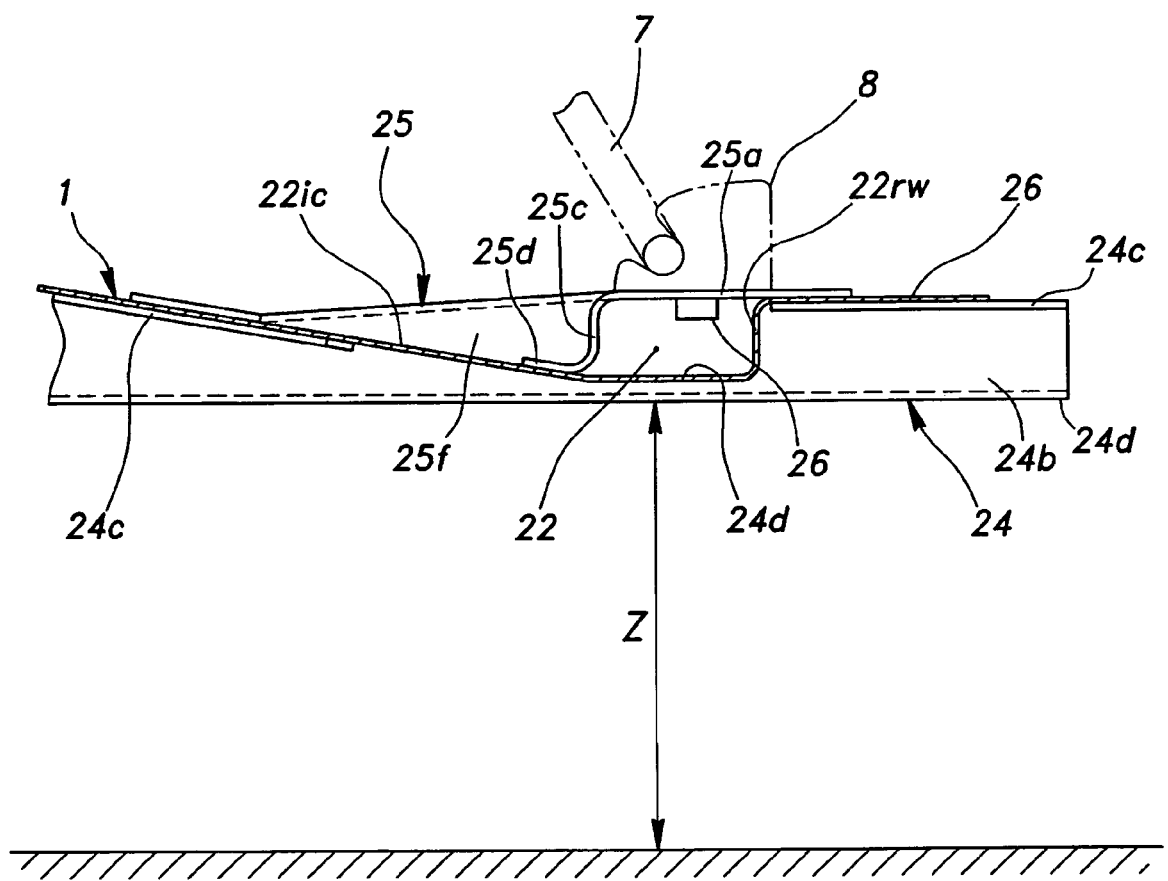
FIG. 5 is an enlarged side view as seem from the direction indicated by arrow B in FIG. 2.
Figure 6A:
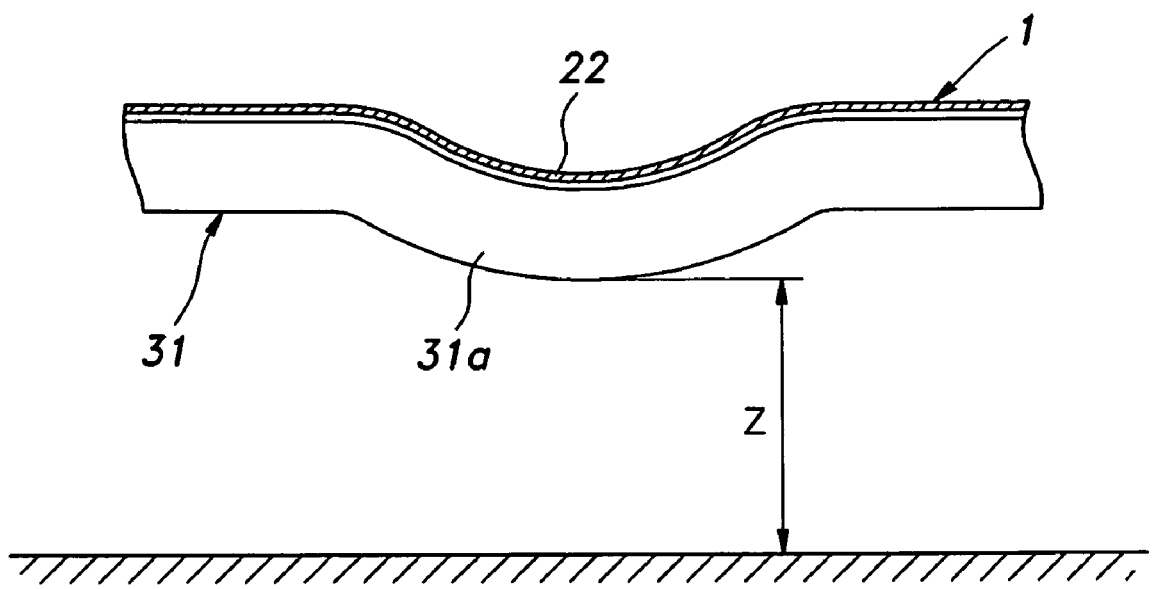
FIGS. 6a and 6b are schematic side views of conventional floor panel assemblies.
Figure 6B:
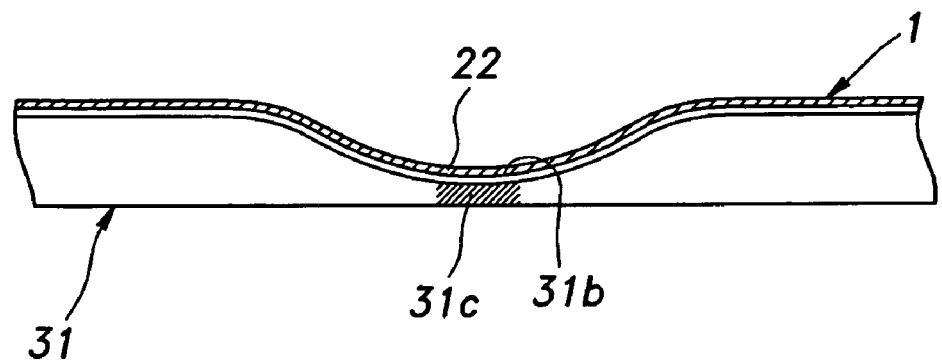

As shown in FIGS. 3 to 5, a rear lower floor frame (lower reinforcement) 24 consisting of a longitudinally elongated stamp-formed steel sheet member having a C-shaped cross section is welded to a laterally central part of the lower surface of each of the right and left rear portions (the portion on either side of the floor tunnel 11) of a rear floor portion 1$rh$ of the floor panel 1. As shown in FIGS. 2, 4 and 5, a rear upper floor frame (upper reinforcement) 25 consisting of a longitudinally elongated but shorter stamp-formed steel sheet member is welded to a laterally central part of the lower surface of each of the right and left rear portions (the portion on either side of the floor tunnel 11) of the rear floor portion 1$rh$ of the floor panel 1 opposite to the corresponding one of the rear lower floor frames 24.

Each rear lower floor frame 24 is provided with a relatively flat bottom wall 24$a$ and a pair of first vertical walls 24$b$ extending vertically from either side edge of the bottom wall 24$a$. The height of each first vertical wall 24$b$ is progressively reduced from a full height at the front end thereof to a minimum height at an intermediate part 24$d$ thereof, and is provided with a constant full height portion extending from the intermediate part thereof to the rear end thereof. The reduced height of each first vertical wall 24b substantially conforms to the lower surface of the corresponding one of the recesses 21 and 22 and accommodates the slanted bottom surface 21ic or 22ic of the recess 21 or 22. In other words, the upper edges of the first vertical walls 24b closely follow the contour of the opposing lower surface of the floor panel 1. The upper ends of the first vertical walls 24b of each rear lower floor frame 24 are provided with external flanges 24c, respectively, and the rear lower floor frame 24 is attached to the lower surface of the floor panel 1 by spot welding these flanges 24c to the corresponding parts of the lower surface of the floor panel 1. Such spot welded parts are denoted by SW in FIG. 4. It is also possible to use other means of attachment such as rivets, screws and bonding agents without departing from the spirit of the present invention. As best shown in FIG. 4, there is a break in each of the flanges 24c in an intermediate part of thereof. .

Each rear upper floor frame 25 comprises a laterally elongated horizontal rear portion 25a having a rectangular shape (in plan view) and a front potion 25b extending from a laterally central part of the front edge of the rear portion 25a. Therefore, the rear upper floor frame 25 is provided with a shape of letter-L (in plan view). The main part of the front portion 25b is provided with a pair of vertically downwardly extending second vertical walls 25f extending from either side edge of the front portion 25b The rear portion 25a is spot welded to the upper surface of the corresponding part of the horizontal raised section 26 of the rear floor portion 1rh of the floor panel 1. The front edge of the rear potion 25a overhangs above the rear end of the corresponding recess 21 or 22. A pair of third vertical walls 25c extend downwards from the front edge of the rear portion 25a on either side of the front portion 25b, and is spot welded to the bottom surface of the corresponding recess 21 or 22 via flanges 25d. The overhang portion of the rear portion 25a is provided with three openings 25e or other features for securing the catch device 8 for the rear seat, and a nut is welded to a part of the lower surface of the overhand portion of the rear portion 25a corresponding to one of the openings 25e.

The front portion 25b extends substantially horizontally, and is provided with a laterally extended front end which is spot welded to the slanted bottom surface 21ic or 22ic of the corresponding recess 21 or 22. The lower edge of each second vertical wall 25f conforms to the slanted bottom surface 21ic or 22ic of the corresponding recess 21 or 22. In other words, the lower edges of the vertical walls 25f closely follow the contour of the upper surface of the floor panel 1. These second vertical walls 25f are formed as a continuous extension of the third vertical walls 25c of the rear portion 25a, respectively.

In the illustrated embodiment, the height of the first vertical walls 24b is reduced in the intermediate parts 24d thereof to accommodate for the downwardly projecting lower surface of the corresponding recess 21 or 22, but the mechanical strength and rigidity of the surrounding part of the floor panel assembly which would be otherwise reduced is compensated for by the increased height of the second vertical walls 25f of the opposing part of the rear upper floor frame 25 which extend into the corresponding recess 21 or 22. In particular, the bottom wall 24a and first vertical walls 24b of the rear part of each rear lower floor frame 24 forms a closed cross section in cooperation with the opposing floor panel 1, and the front portion 25b and second vertical walls 25f forms a similar closed cross section in cooperation with the opposing floor panel 1. Furthermore, the lower surface of the rear lower floor frames 24 and the upper surface of the rear upper floor frame 25 may each define a substantially horizontal profile. Thereby, the height of a lowest part of the floor panel from the ground surface is not required to be reduced, and the mechanical strength of the floor panel would not be compromised even when the floor pane is provided with a downward projection.

Also, because the catch device 8 for the rear seat 6 is provided in the overhang portion of the rear portion 25a of the rear upper floor frame 25, the rear seat 6 can be supported with an adequate rigidity, and an easy access is provided for the mounting of the catch device 8. Also, despite the presence of the recesses 21 and 22 and draining holes 23 in the floor panel 1 for the draining of paint liquid, the rear lower floor frames 24 and the rear upper floor frame 25 can adequately reinforce the corresponding part of the floor panel 1. In short, the compound longitudinal floor frame formed by the rear lower floor frames 24 and the rear upper floor frame 25 can favorably reinforce the floor panel so as to minimize vibrations and noises, prevent stress concentration and ensure a favorable distribution of crash impact energy.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An automotive floor panel assembly, comprising:
   a floor panel stamp-formed of sheet metal and including a recess defining an upper concave surface and a lower convex surface;
   a lower reinforcement extending longitudinally across a part of the lower convex surface of the floor panel, the lower reinforcement including a first vertical wall having an upper edge closely following a contour of the lower convex surface; and
   an upper reinforcement extending longitudinally across a part of the upper concave surface of the floor panel, the upper reinforcement including a second vertical wall having a lower edge closely following a contour of the upper concave surfaces;
   wherein the recess is defined by a slanted surface slanting downward from a front part of the recess to a rear part of the recess and a vertical wall which rises substantially upright from the rear part of the recess.

2. An automotive floor panel assembly according to claim 1, wherein the vertical wall of the floor panel has an upper end which is connected to a substantially horizontal raised rear portion of the floor panel.

3. An automotive floor panel assembly according to claim 1, wherein the floor panel is provided with a longitudinal floor tunnel extending longitudinally across a laterally middle part of the floor panel, and the recess is provided on each lateral side of the floor tunnel.

4. An automotive floor panel assembly according to claim 1, wherein the lower reinforcement comprises a substantially horizontal bottom wall, and the first vertical wall extends vertically from a lateral edge of the bottom wall.

5. An automotive floor panel assembly according to claim 4, wherein the first vertical wall is attached to the lower surface of the floor panel via a flange extending laterally from an upper edge of the vertical wall.

6. An automotive floor panel assembly according to claim 5, wherein the flange is provided in a front part and a rear part of the lower reinforcement, and there is a break between the flanges in the front and rear parts of the lower reinforcement.

7. An automotive floor panel assembly according to claim 1, wherein the lower reinforcement comprises a relatively horizontal bottom wall, and the first vertical wall extends vertically from each lateral edge of the bottom wall.

8. An automotive floor panel assembly according to claim 7, wherein each first vertical wall is attached to the lower surface of the floor panel via a flange extending laterally from an upper edge of the vertical wall.

9. An automotive floor panel assembly according to claim 8, wherein each flange is provided in a front part and a rear part of the lower reinforcement, and there is a break between the flanges in the front and rear parts of the lower reinforcement.

10. An automotive floor panel assembly according to claim 2, wherein the upper reinforcement comprises a rear portion extending substantially horizontally and attached to the substantially horizontal raised rear portion of the floor panel, and a front portion extending forwardly from a front edge of the rear portion and having a front end attached to an upper surface of the floor panel.

11. An automotive floor panel assembly according to claim 10, wherein the upper reinforcement further comprises a third vertical wall extending downwardly from a front edge of the rear portion, the third vertical wall being attached to a bottom surface of the recess via a flange.

12. An automotive floor panel assembly according to claim 11, wherein the second vertical wall is integrally and continuously connected to the third vertical wall.

13. An automotive floor panel assembly according to claim 10, wherein the front portion extends forwardly from a central part of the front edge of the rear portion, and a third vertical wall extends downwardly from a front edge of the rear portion on each side of the front portion.

14. An automotive floor panel assembly according to claim 13, wherein the second vertical wall extends downwardly from each lateral edge of the front portion, and is integrally and continuously connected to the corresponding third vertical wall.

15. An automotive floor panel assembly according to claim 10, wherein the rear portion includes an overhang portion which overhangs above the recess of the floor panel, and this overhang portion is provided with a feature for supporting a leg of a seat.

* * * * *

UNITED STATES PATENT AND TRADEMARK OFFICE
CERTIFICATE OF CORRECTION

PATENT NO. : 7,407,223 B2 Page 1 of 1
APPLICATION NO. : 11/370431
DATED : August 5, 2008
INVENTOR(S) : Ito et al.

It is certified that error appears in the above-identified patent and that said Letters Patent is hereby corrected as shown below:

Column 6, Line 42 (Claim 1, Line 14), delete "surfaces", insert --surface--

Signed and Sealed this

Thirtieth Day of September, 2008

JON W. DUDAS
*Director of the United States Patent and Trademark Office*